United States Patent [19]
Aidlin et al.

[11] Patent Number: 5,103,961
[45] Date of Patent: Apr. 14, 1992

[54] METHOD AND APPARATUS FOR FEEDING PARTS

[75] Inventors: Stephen H. Aidlin; Samuel S. Aidlin; Larry Kincaid, all of Sarasota; Glenn Enright, Bradenton, all of Fla.

[73] Assignee: Aidlin Automation Corp., Sarasota, Fla.

[21] Appl. No.: 647,166

[22] Filed: Jan. 24, 1991

Related U.S. Application Data

[63] Continuation of Ser. No. 07/382,292, Jul. 20, 1989, abandoned.

[51] Int. Cl.$^5$ .............................................. B65G 47/46
[52] U.S. Cl. .................................... 198/367; 198/389; 198/408; 198/419.1
[58] Field of Search ............ 198/367, 389, 442, 419.1, 198/404, 408, 463.6

[56] References Cited

U.S. PATENT DOCUMENTS

| | | | |
|---|---|---|---|
| 2,670,835 | 3/1954 | Huttmann | 198/419.1 |
| 2,771,177 | 11/1956 | Cutter et al. | 198/419.1 |
| 2,923,397 | 2/1960 | Parrish | 198/404 |
| 3,133,670 | 5/1964 | Heyer | 198/419.1 |
| 3,193,078 | 7/1965 | Amenta | 198/419.1 |
| 4,223,778 | 9/1980 | Kontz | 198/389 |
| 4,271,587 | 6/1981 | Shields | 198/408 |
| 4,505,372 | 3/1985 | Sato | 198/408 |

FOREIGN PATENT DOCUMENTS 938823 6/1982 Japan .................................. 198/389

Primary Examiner—Joseph E. Valenza
Attorney, Agent, or Firm—Dominik, Stein, Saccocio, Reese, Colitz & Van Der Wall

[57] ABSTRACT

A method and apparatus for receiving a plurality of component parts of a hypodermic syringe, at least some of which are elongated with one enlarged end, from a plurality of molding machines and for conveying such parts in a programmed manner to a plurality of assembly machines including a plurality of coneyors each having a primary conveyor paths for feeding parts from a molding machine and a plurality of secondary conveyor paths for feeding parts from a primary conveyor path to the assembly machines; diverter means between the primary conveyor path and secondary conveyor path for directing parts to a preselected one of the secondary conveyors and to a preselected assembly machine; isolator means on a primary conveyor path to separate a predetermined number of parts from all other parts and to allow such separated parts to be fed as a group to the diverter means; and orienting means associated with at least some of the primary conveyor path to move elongated parts in a hopper to a position at the input end of a primary conveyor path with the axes of the parts aligned in the direction of conveying.

2 Claims, 9 Drawing Sheets

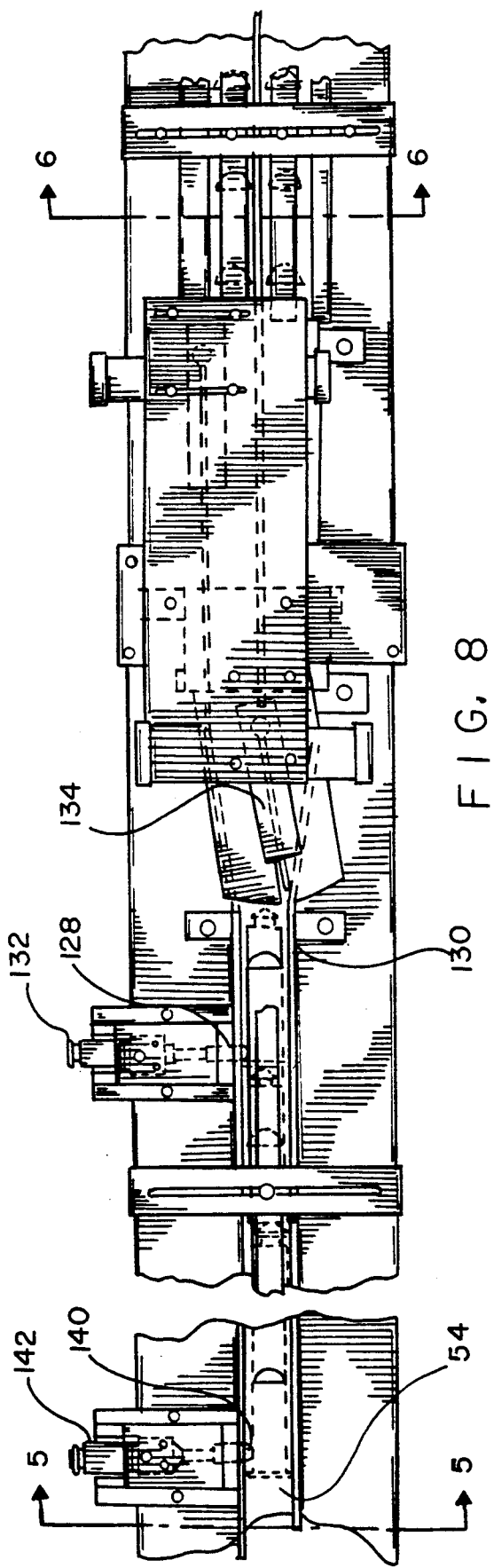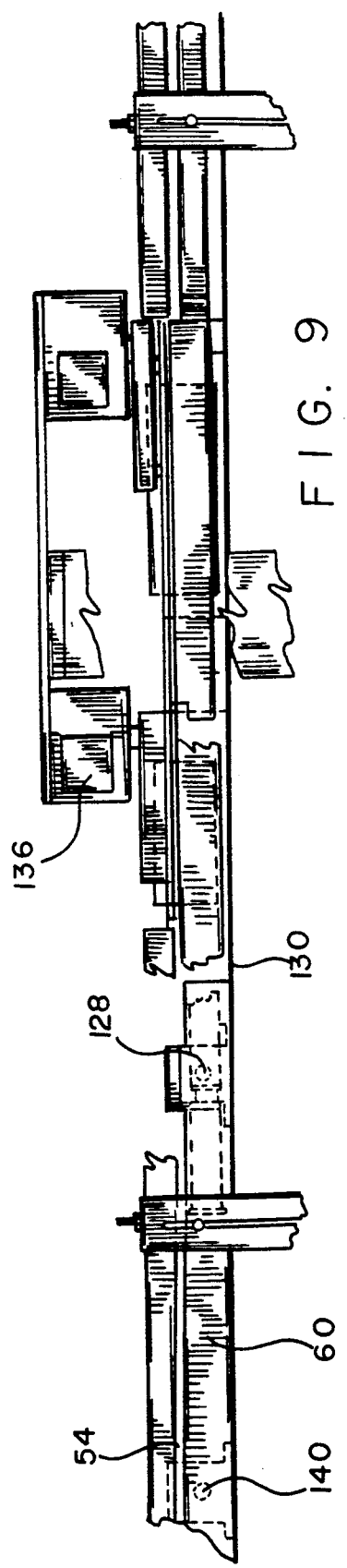

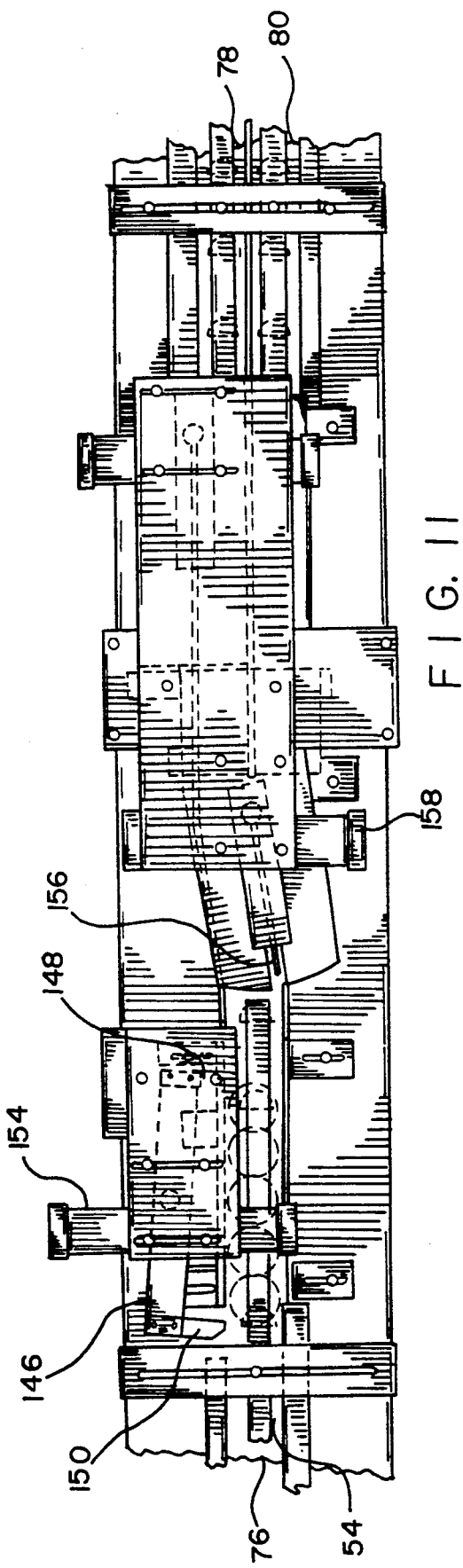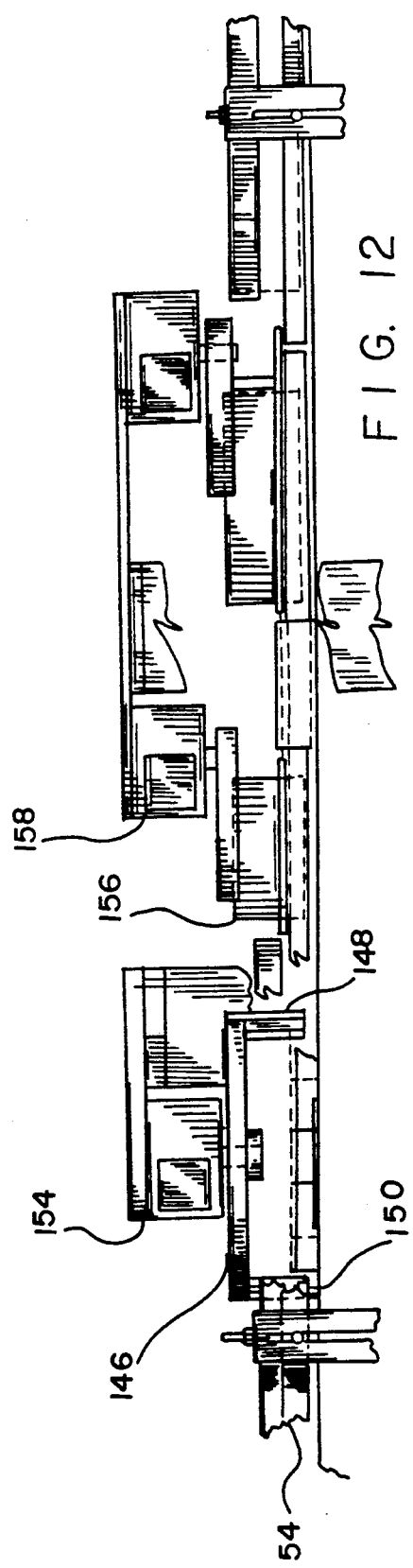

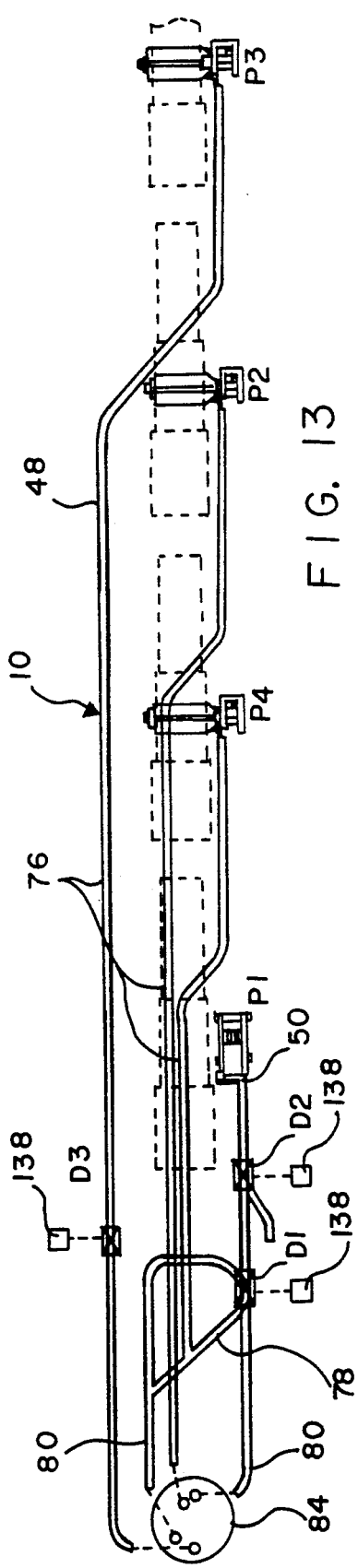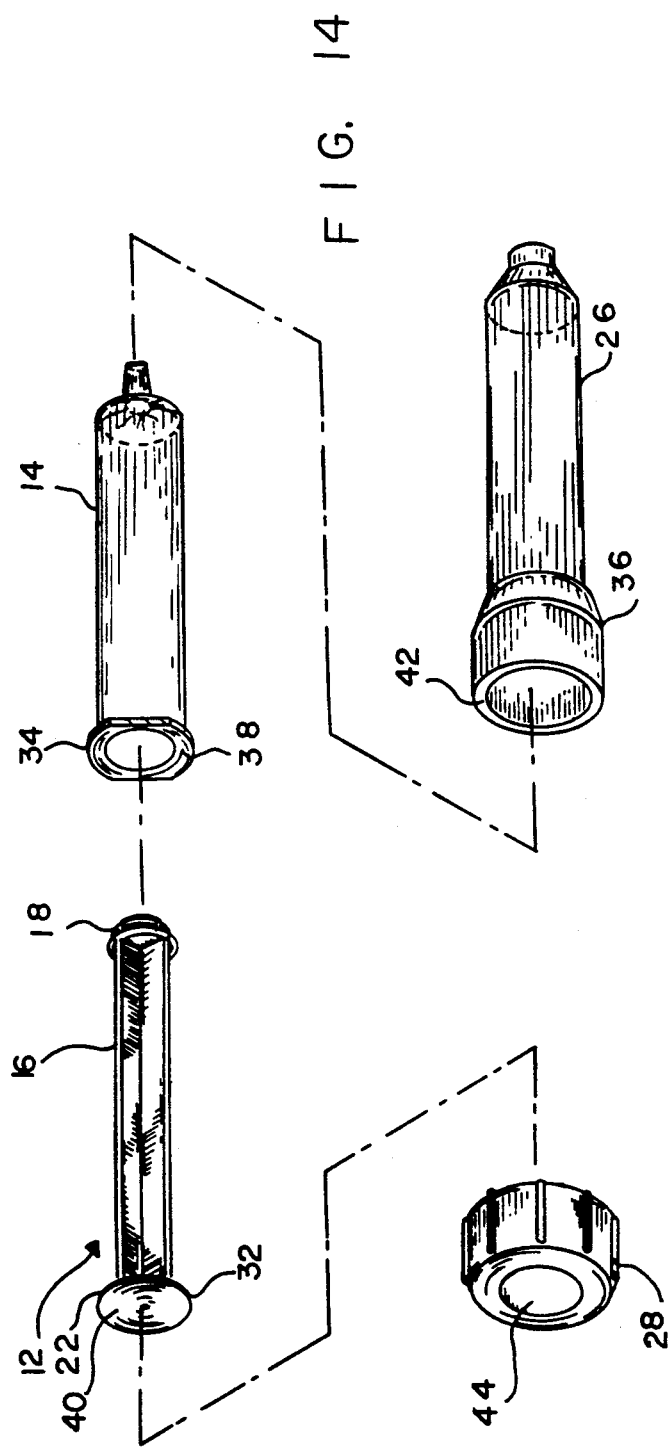
FIG. 13
FIG. 14

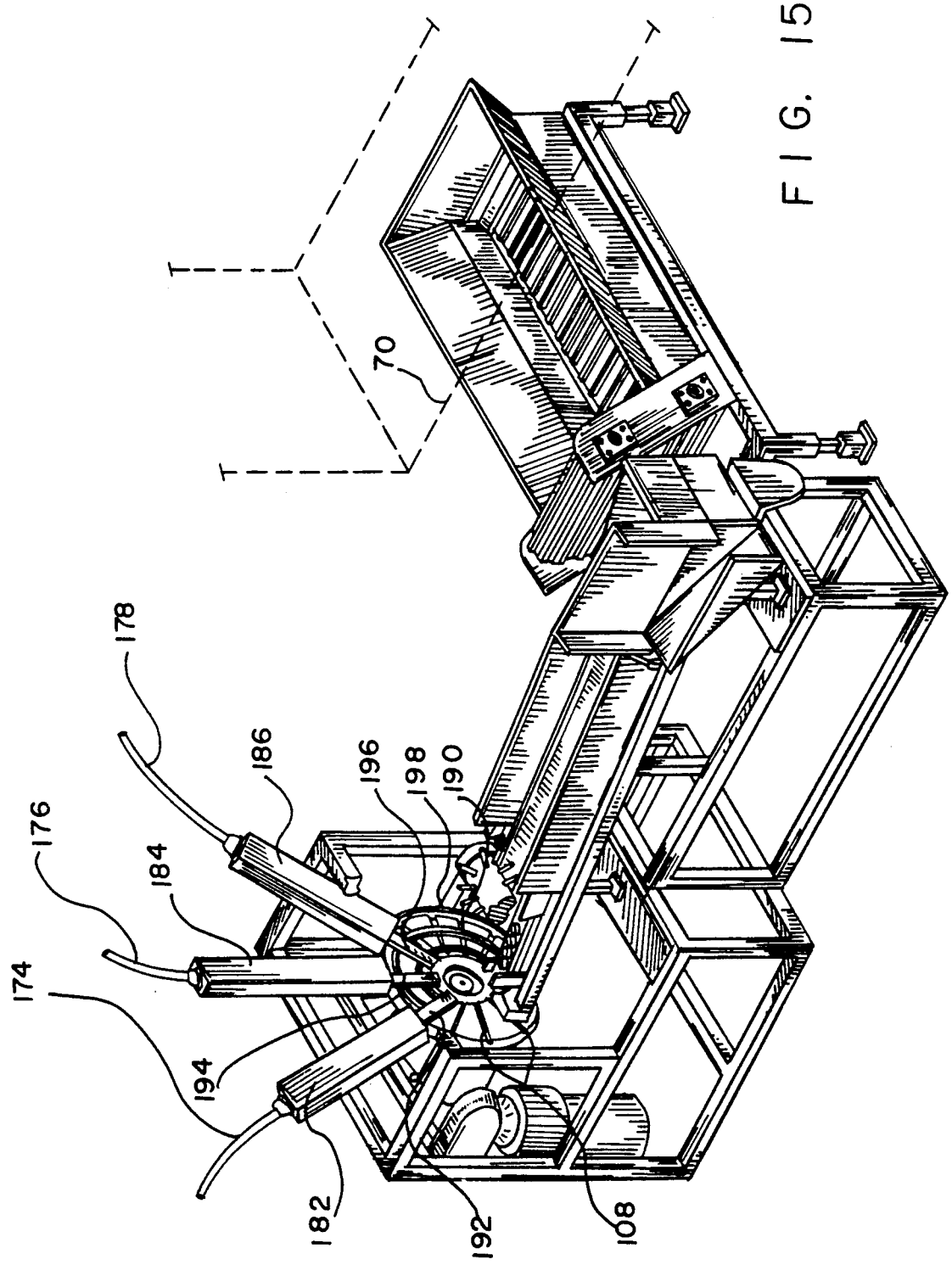

METHOD AND APPARATUS FOR FEEDING PARTS

This is a continuation of co-pending application Ser. No. 07/382,292 filed on Jul. 20, 1989, now abandoned.

FIELD OF THE INVENTION

The invention relates to a method and apparatus for feeding parts of a hypodermic syringe and, more particularly, to the feeding of hypodermic syringe parts from a plurality of injection molding machines to a plurality of assembly machines.

DESCRIPTION OF THE BACKGROUND ART

Modern hypodermic syringes are fabricated from a plurality of injection molded plastic parts. Each of the various parts are fabricated at different injection molding machines, each having a different speed of operation. Such fabricated parts are then fed along individual conveyors to an assembly machine or machines whereat the parts are assembled to thereby constitute a fabricated product for entry into the stream of commerce.

In an ideal situation, each of the molded parts would come off of its particular injection molding machine at a common rate of speed for being fed to the assembly machine by conveyors operating at the common rate of speed. The assembly machine would then assemble the parts at a rate of speed equal to the rate of speed of the individual injection molding machines and the conveyors. In such a situation, one injection molding machine for each part, would feed each part on a conveyor to one assembly machine, all at a common rate of speed.

Unfortunately, the rates of fabrication speed of injection molding machines vary one to another as functions of the types of components being fabricated. Such rates of speed are, further, not specifically correlated to the speeds of the assembly machines. As a result, it has been found preferable to utilize one or more injection molding machines for each of the various component parts as a function of the speed of fabrication and to feed the output of the various injection molding machines to the assembly machines in a consistent manner by conveyors in a programmed manner and at a speed which correlates to the speeds of the injection molding machines and the assembly machines.

The literature discloses various systems for feeding hypodermic syringe component parts as well as components for other assembled plastic items of commerce in a preprogrammed manner. Note, for example, U.S. Pat. Nos. 2,824,361 to Brown; 3,359,619 to Walkden and 3,588,985 to Shields wherein hypodermic syringe component parts are fed from injection molding machines to a common assembly machine. Consider also U.S. Pat. No. 4,822,214, to Aidlin et al., issued Apr. 18, 1989, wherein components of a plastic bottle are fed from injection molding machines to a common assembly machine. None of the prior devices, however, feed the component parts from pluralities of injection molding to a plurality of assembly machines in a preprogrammed fashion for maximum efficiency of the machinery.

Therefore, it is an object of this invention to provide an apparatus which overcomes the aforementioned inadequacies of the prior art devices and which constitutes an improvement which is a significant contribution to the advancement of the art.

Another object of this invention is to provide a method and apparatus for receiving a plurality of component parts of a hypodermic syringe, at least some of which are elongated with an enlarged end, from a plurality of molding machines and for conveying such parts in a programmed manner to a plurality of assembly machines including a plurality of conveyors each having a primary conveyor path for feeding parts from a molding machine and a plurality of secondary conveyor paths for feeding parts from a primary conveyor path to the assembly machines; diverter means between the primary conveyor path and secondary conveyor paths for directing parts to a preselected one of the secondary conveyors and to a preselected assembly machine; isolator means on a primary conveyor path to separate a predetermined number of parts from all other parts and to allow such separated parts to be fed as a group to the diverter means; and orienting means associated with at least some of the primary conveyor paths to move elongated parts in a hopper to a position at the input end of a primary conveyor path with the axes of the parts aligned in the direction of conveying.

It is a further object of the invention to feed hypodermic syringe parts from injection molding machines along conveyors to assembly machinery in a programmed manner to maximize the efficiency of the system.

Still further it is an object of the present invention to maximize the efficiency of injection molding machines and assembly machinery coupled together by conveyors and diverters in a systems configuration.

Lastly, it is an object of the present invention to assemble hypodermic syringes from component elements in a more convenient, efficient and economical manner.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The present invention is defined by the appended claims for the purposes of summarizing the invention, the invention may be incorporated into a system for receiving a plurality of component parts of a hypodermic syringe, at least some of which are elongated with an enlarged end, from a plurality of molding machines and for conveying such parts in a programmed manner to a plurality of assembly machines including a plurality of conveyors each having a primary conveyor path for feeding parts from a molding machine and a plurality of secondary conveyor paths for feeding parts from a primary conveyor path to the assembly machines; diverter means between the primary conveyor path and secondary conveyor paths for directing parts to a preselected one of the secondary conveyors and to a preselected assembly machine; isolator means on a primary conveyor path to separate a predetermined number of parts from all other parts and to allow such separated parts to be fed as a group to the diverter means; and orienting means associated with at least some of the primary conveyor paths to move elongated parts in a hopper to a position at the input end of a primary conveyor path with the axes of the parts aligned in the direction of conveying. The orienting means includes a hopper with sidewalls sloping downwardly and with a slot therebetween and an indexing wheel rotatable about a horizontal axis with radial recesses to receive elongated parts vertically depending from the slot and means to rotate the indexing wheel and the received parts so that each received elongated part is moved to an orientation for being received by the primary conveyor path at its input end.

The present invention may also be incorporated into apparatus for supporting a plurality of parts randomly oriented in a hopper, the parts being elongated with an enlargement at one end, and for moving them sequentially to the input end of a conveyor path for being conveyed with their axes aligned in the direction of the conveyor comprising, in combination: a hopper with sidewalls downwardly sloping with a slot therebeneath of a size to support therefrom the enlarged end of each part but to allow the majority of the length of each part to vertically depend downwardly therefrom; an indexing wheel located at the end of the slot and rotatable about a horizontal axis off-set from the slot and formed with radial recesses to sequentially receive the elongated parts depending from the slot; and means to rotate the indexing wheel and thereby move each received part so that the received part is positioned for being received by the input end of the conveyor path. The apparatus further includes a pair of counter-rotating rollers spanning the sidewalls with the slot being formed therebetween to upwardly urge the parts in the hopper and thereby abate the jamming of parts at the bottom of the hopper. The apparatus further includes a beater bar above the slot adjacent to the end of the slot to urge excess parts away from the indexing wheel and thereby abate jamming of the parts as they move from the slot to the recess.

The invention may also be incorporated into apparatus for receiving a plurality of component parts from molding machines and for conveying such parts to a plurality of assembly machines including a conveyor having a primary conveyor path for feeding parts from the molding machines and a plurality of secondary conveyor paths for feeding parts from the primary conveyor path to the assembly machines; diverter means between the primary conveyor path and the secondary conveyor paths for directing parts to a preselected one of the secondary conveyors and to a preselected assembly machine; and isolator means on the primary conveyor path to separate a predetermined number of parts from all other parts and to allow such separated parts to be fed as a group to the diverter means. The isolator means may include an upstream plate and a downstream plate and means to move the downstream plate into interference relationship with the conveyed parts and means to move the upstream plate into interference with the conveyor parts subsequent to the first plate for entrapping the predetermined number of component parts to be fed. The isolation means may include a rockable member with first and second interference plates spaced a distance corresponding to the length of the group of isolated parts, and means to move the rockable member between positions where the first and second plates alternately restrict movement of the parts along the secondary conveyor path.

In addition, the invention may be incorporated into a method for conveying elongated component parts, each with an enlarged end, from a plurality of injection molding machines to a plurality of assembly machines including the steps of: (1) supporting a plurality of the elongated parts randomly oriented in a hopper having sidewalls downwardly sloping toward a slot of a size to support the enlarged end of each part therefrom but to allow the majority of the length of each part to vertically depend downwardly therefrom; (2) moving the supported parts sequentially along the slot to the input end of a primary conveyor path for being conveyed with their axes aligned in the direction of the conveyor; (3) positioning an indexing wheel at the end of the slot, the indexing wheel being formed with radial recesses to sequentially receive the elongated parts depending from the slot; (4) rotating the indexing wheel about a horizontal axis for thereby moving each received part so that the received part is positioned for being received by the input end of the primary conveyor path; (5) conveying the component parts along the primary conveyor path and a plurality of secondary conveyor paths for directing the flow of component parts to be assembled to the assembly machines; (6) isolating a predetermined number of component parts on the primary conveyor path; and (7) diverting between the primary and secondary conveyor paths the isolated component parts for directing component parts to one assembly machine or the other in a preprogrammed manner.

Lastly, the invention may be incorporated into apparatus for supporting a plurality of elongated parts, each having an enlarged end, which are randomly oriented in a hopper and for moving them sequentially to the input end of conveyor means for being conveyed with their axes aligned in the direction of the conveyor. The apparatus includes, in combination, a hopper with downwardly sloping sidewalls and with a slot therebeneath of a size to support therefrom the enlarged end of each part but to allow the majority of the length of each part to vertically depend downwardly therefrom; an indexing wheel located at the end of the slot and rotatable about an axis off-set from the slot and formed with radial recesses to sequentially receive the elongated parts depending from the slot; and means to rotate the indexing wheel and thereby move each received part so that the received part is positioned for being received by the input end of the conveyor means. The apparatus further includes a cage fixedly positioned with respect to the indexing wheel, the cage having openings in locations corresponding to the conveyor means to preclude movement of the received parts from the indexing wheel at other than at the conveyor means. The conveyor means is a plurality of pneumatic tubes spaced around the indexing wheel.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other methods and structures for carrying out the same purposes of the present invention. It should also be realized by those skilled in the art that such equivalent methods and constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 8 is a plan view of the conveyor assembly shown in FIG. 7.

FIG. 9 is a side elevational view of the conveyor assembly shown in FIGS. 7 and 8.

FIG. 11 is a plan view of the portion of the conveyor assembly shown in FIG. 10.

FIG. 12 is a side elevational view of the portion of the conveyor assembly shown in FIG. 11.

FIG. 13 is a schematic illustration of a system for fabricating component parts and assembling the parts into hypodermic syringes in accordance with the principles of the present invention.

FIG. 14 is an exploded perspective illustration of the component parts of the hypodermic syringe to be fabricated and assembled in accordance with the principles of the present invention.

FIG. 15 is a perspective illustration of input mechanisms to the system constructed in accordance with an alternate embodiment of the present invention.

Similar reference characters refer to similar parts throughout the several views of the drawings.

DETAILED DESCRIPTION OF THE PREFERRED EMBODIMENT

Figure 1:
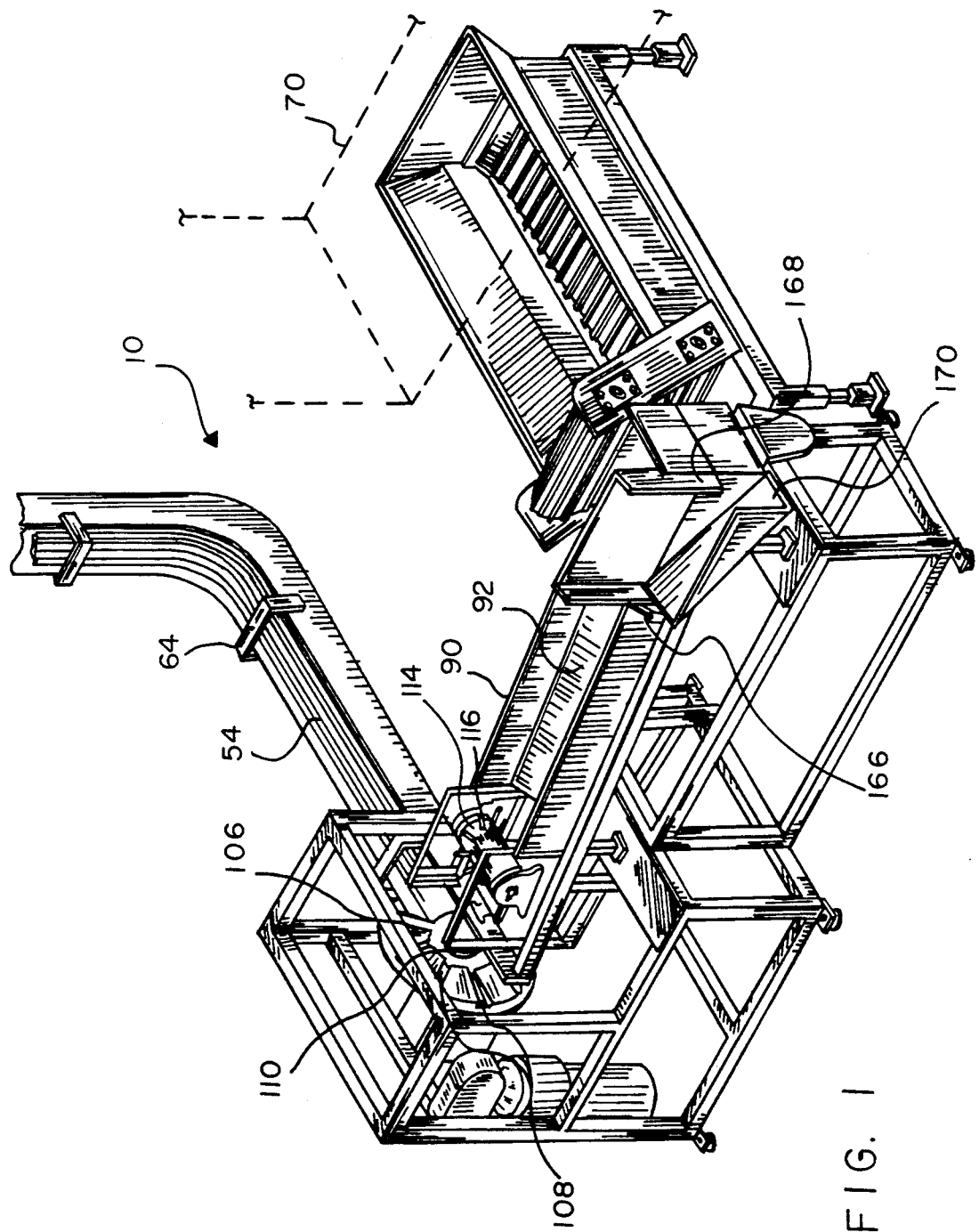
FIG. 1 is a perspective illustration of one of the input mechanisms to the system of the present invention.
Figure 2:
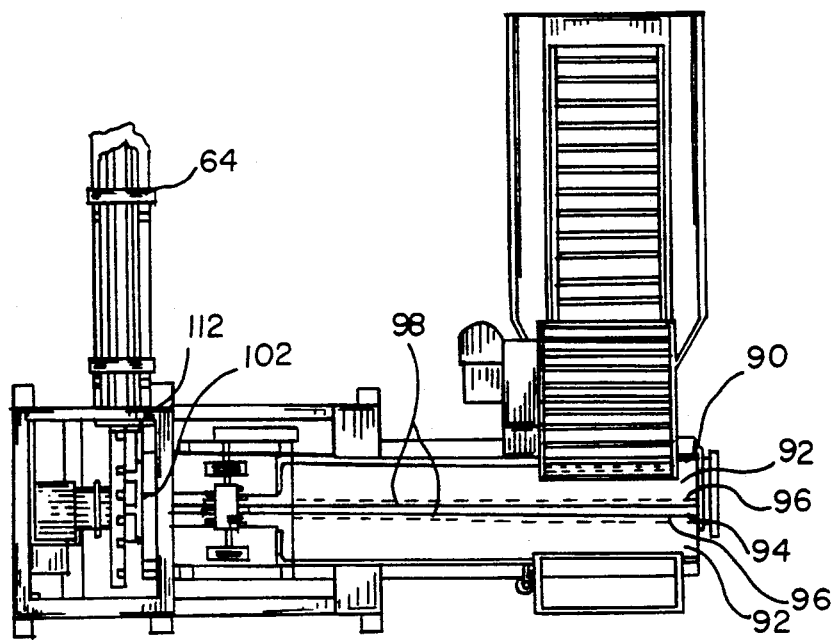
FIG. 2 is a plan view of the input mechanism shown in FIG. 1.
Figure 3:
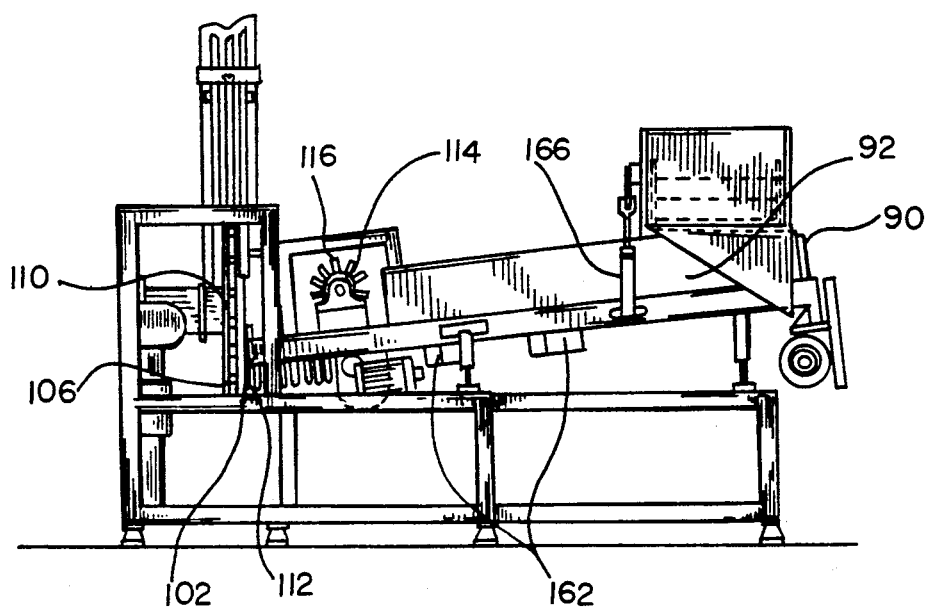
FIG. 3 is a side elevational view of the mechanism shown in FIGS. 1 and 2.
Figure 4:
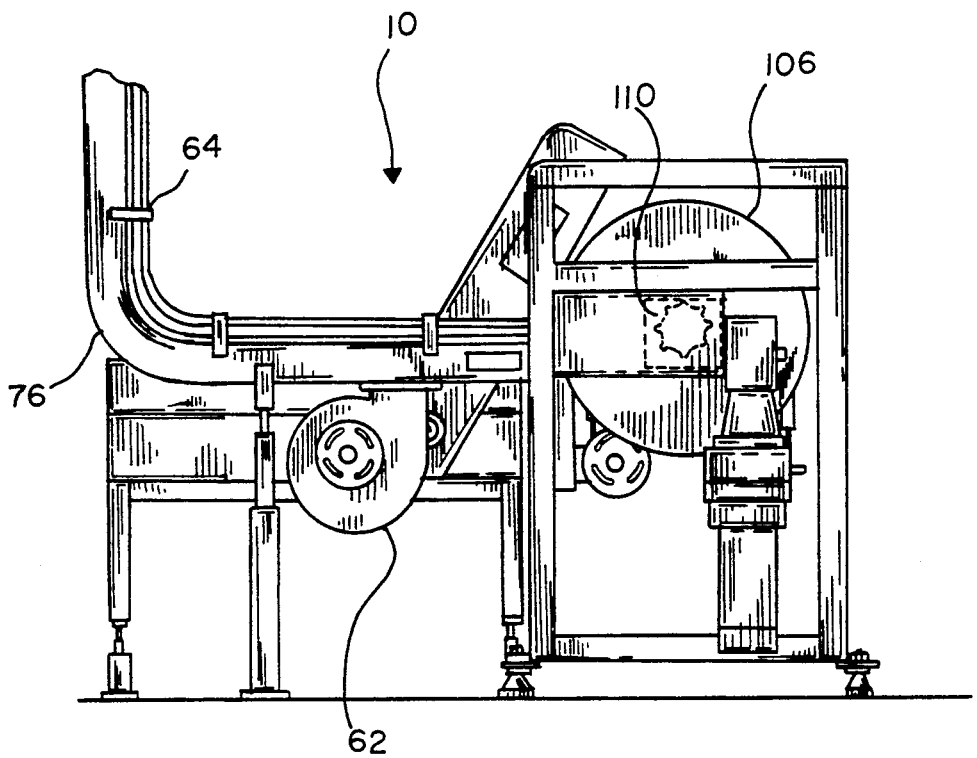
FIG. 4 is a rear elevational view of the mechanism shown in FIGS. 1, 2 and 3.
Figures 5, 6:
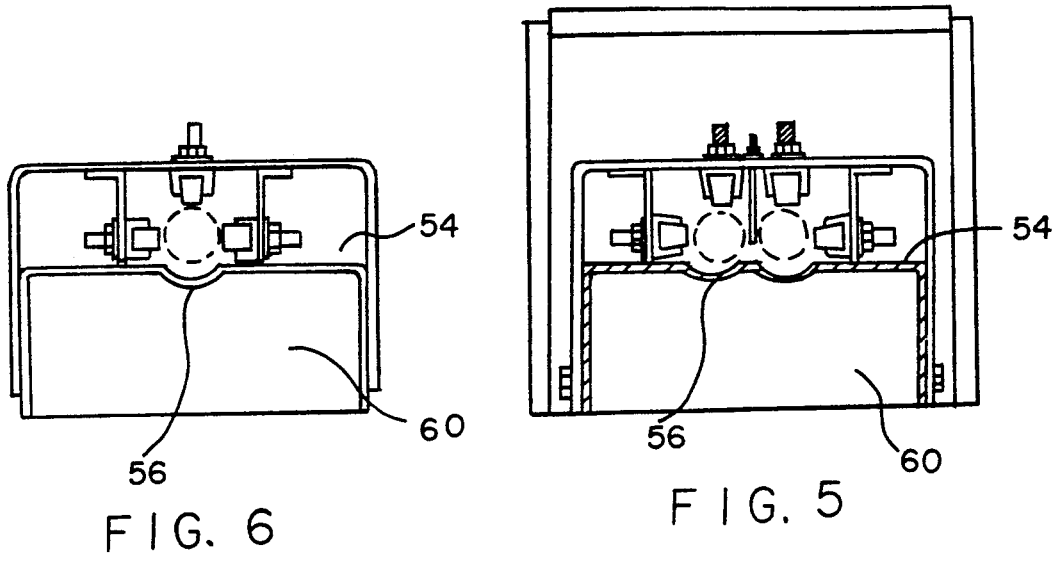
FIGS. 5 and 6 are sectional views of the conveyor assembly shown in FIGS. 1, 2, 3 and 4 taken along lines 5—5 and 6—6 of FIG. 11.
Figure 7:
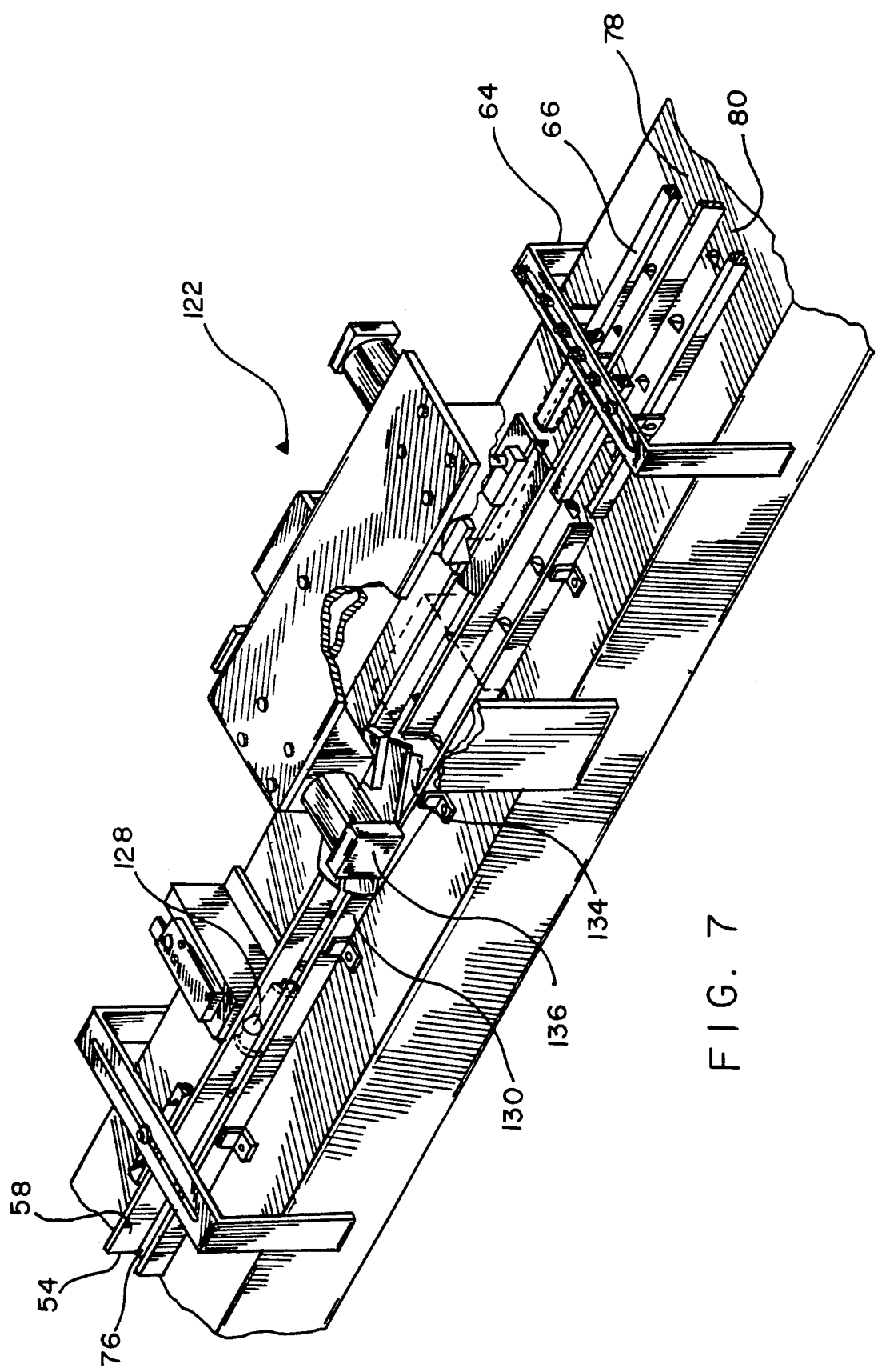
FIG. 7 is a perspective illustration of a conveyor assembly segment of the system of the present invention.

Shown in FIG. 1 is a perspective showing of part of a system 10 for fabricating and assembling hypodermic syringes 12 from its various component parts. The component parts can best be seen in FIG. 14 and include a main body 14 for the fluid to be injected. Positionable partially within the body 14 is the plunger 16 having a cylinder 18 at its lower end 20 for being received within the body 14 and also having an external thumb portion 22 at its upper end for sliding the cylinder 18 within the body for dispensing fluid through an orifice at the lower end of the body 14. The third part is the cover 26, an elongated cup-shaped part for receiving the body 14 and the plunger 16. The fourth and last part is a cap 28 for closing the cover 26. The first three parts, the body 14, the plunger 16 and the cover 26 are elongated with enlargements 32, 34 and 36 at their upper ends 38, 40 and 42 and are adapted to be fed by conveyors in the direction of their axes by the air transport assembly. The caps 28, on the other hand, are generally flat in shape and fed along their air transport assemblies with their bases 44 extending downwardly, and with their axes parallel with each other, perpendicular to their direction of travel.

The first three parts are the elongated parts. They are all fed along their respective paths of travel along transport conveyor assemblies 48 by flows of air. The transport assemblies for the elongated parts as well as transport conveyor assemblies 50 for the flat caps are generally of the type described generally in U.S. Pat. No. 4,822,214 to Aidlin et al, issued Apr. 18, 1989. It includes a channel shaped member 54 with upwardly facing louvers 56 adapted to effect a flow of air beneath the part being conveyed and in the direction of part movement. Side walls 58 constrain the conveyed parts against lateral movement. A lower elongated plenum chamber 60 and blowers 62 provide the air flow through the louvers to effect the intended part movement. Exterior brackets 64 with interior brackets 66 retain the conveyor components in proper orientation for operation and use.

As the component parts are fed from the injection molding machines 70 (P1, P2, P3, P4) at which they are fabricated, they may be redirected by a diverter gate periodically for movement of the parts from the primary transport assembly 76 from the injection molding machines 70 along one of two secondary transport assemblies 78 and 80 to assembly machines 84 for being coupled with the other parts of the hypodermic syringe in anticipation of entry into the stream of commerce. FIG. 13 illustrates but a single assembly machine 84. It should be understood that an additional such machine or machines are stacked one above the other or may even be offset therefrom. Further, a barrel printing machine may be utilized immediately in advance of any assembly machine, following any conveyor for adding appropriate markings to any part.

Included within the system 10 of the present invention is the mechanism for feeding the bodies 14, plungers 16 and covers 26 into an axially aligned manner onto the conveyors 48. The elongated parts are initially supported in a hopper 90 as they are fed from the injection molding machines 70. Each hopper 90 has tapered bottom walls 92 with angled upstanding ribs and a central slot 94 located in the direction of part movement. Adjacent to its edges 96, the slot has a pair of smooth parallel rollers 98 rotatable to upwardly urge the bodies 14 randomly received therein whereby they may depend with their lower ends extending downwardly and with the enlarged upper ends 38 spanning the space between the rollers 98 and supported thereby. The slot 94 and rollers 98 are angled downwardly toward the hopper output end 102 to gravity feed the depending parts 14 toward an indexing wheel 106.

The alignment wheel has recesses 108 of a size to receive one elongated body 14 with its enlarged end 38 closer to the axis of rotation of the wheel 106 as the part is moved from the hopper 90 to the indexing wheel 106 and then to the conveyor 48 at its in-put end. The radial recesses 108 receive the enlarged upper ends 38 closer to the axis 110 with its lower end extending downwardly. A fixedly positioned curved retainer bar 112 is located adjacent the periphery of the indexing wheel from the 12 o'clock position, whereat the indexing wheel receives the parts, to slightly beneath the 3 o'clock position, whereat the parts are picked up by the conveyor. The retainer bar 112 retains the parts within the recesses of the indexing wheel during movement thereby. A beater bar 114 with a semi-rigid hoses 116 above the parts 14 rotates about a transverse axis against the feeding of parts 14 to urge excess parts rearwardly and to preclude the excess parts from being received within the recesses 108. When parts are received in the recesses 108, the wheel 106 will index ninety (90) degrees in a timed fashion to move the supported part until its axis is horizontal and in alignment with the conveyor assembly 48 for being transported from the injection molding machinery 70 and through the split feed diverter gate.

In view of the fact that some injection molding machines for certain parts function at a rate essentially twice as fast as the rate at which they are coupled together at the assembly machines, a split feed diverter assemblies 122 and 124 are provided between the primary 76 and secondary 78 and 80 conveyor assemblies.

In order to attain even or correlated flows along all conveyor assemblies, a first or downstream interference member 128 is placed near the terminal end 130 of the primary conveyor 76 for elongated parts prior to a diverter gate 134. The first interference member 128 is actuated by a solenoid 132 which is controlled in a preprogrammed fashion by a central programmable controller 138. A predetermined number of component parts, five for example, will first come to rest with the leading component abutting against the member 128.

A second or upstream interference member 140, along the primary conveyor 76, closer to the injection molding machines 70 than the first member 128, is then actuated through a solenoid 142 in a similar manner to the first plate 128. Such action occurs after a predetermined period of time as determined by controller 138 to entrap the predetermined number of parts for being fed to one assembly machine or the other, depending on the orientation of the diverter gate 134.

With the trapped bodies 14 between the members 128 and 140, the additional flow of components from the injection molding machine will be backed up against the upstream face of the second member 140. The trapped parts are then fed as a group to one injection molding machine upon the energization of the solenoid 136 of the first member 128 to allow the continued feeding of the entrapped parts.

After the entrapped parts have moved on along one alternate conveyor, 78 or 80, the solenoid 136 of the first member 128 is then activated to once again constitute an abutment surface for the next group of parts which will be fed to the other assembly machine upon the energization of the solenoid of the second member 140 for its retraction. Thereafter the second member 140 will again constitute an abutment surface for the subsequent parts.

Prior to the movement of the entrapped bodies 14, the diverter gate 134 is rotated from one position to the other by solenoid 136 so that alternate groups of parts may be fed to one assembly machine or the other assembly machine. Controller 138 effects energization of diverter solenoid 136 with the energization of interference solenoids 132 and 142 for intended, programmed functioning. In such manner the one more rapid injection molding machines may service two of the slower assembly machines.

For the smaller flat closure caps 28, the entrapment device is in the form of a rockable member 146 oscillatable to move the front and rear plates 148 and 150 simultaneously. When rocked to the forward position, the first plate 148 will stop the flow of caps 28. The distance between the front and rear plates is such as to entrap at one time a predetermined number of caps, as for example five (5). At a predetermined time period after five caps have been stopped in the entrapment zone, the rockable member 146 will oscillate by the action of a solenoid 154 to first stop the movement of caps next following the five to be fed. Concurrently, the retraction of plate 148 will allow the continued movement of the five entrapped caps to one assembly machine or the other as a function of the location of the diverter gate 156 through solenoid 158. This is in the same manner as described with respect to the independent diverter gates of the first-described assembly for elongated parts. Controller 138 effects the intended, programmed operation of solenoids 154 and 158.

Further control of the system is provided by two associated sensors 162 and 164 located beneath the hopper to detect the presence or absence of elongated parts depending from slot 94. The sensors are coupled electronically to controller 138 and air cylinder 166.

In those instances where the forward sensors 162 detects that there are no parts in the hopper to be fed, a signal will be generated to terminate the feeding of parts from the hopper to the assembly machines. The inactivity will continue until parts are, in fact, provided to the hopper and such provided parts are detected by the first sensor 162. In those instances, however, where an excess of parts are located in the hopper for being fed, the second or rearward sensor 164 will detect such overload condition through the controller. When such overload condition arises, a signal will be sent from a vertical orientation as shown in FIG. 1 to air cylinder 166 for activating an overflow plate 168 into a horizontal interference position beneath the elevating conveyor to deflect the excess parts away from the hopper 90, as for example, to a box beneath chute 170, until the overload situation is rectified through the normal feeding of parts. Thereafter the proper condition will be detected by sensors 162 and 164 and air cylinder 166 will once again raise the diverted plate so that the elevating conveyor will once again drop its parts into the hopper rather than onto the lowered plate 168 in its intended feeding fashion.

Shown in FIG. 13 is an overall system 10 constructed in accordance with the principles of the present invention. This system is but one of many illustrative configurations possible. The preferred embodiment discloses assembly machines 84, one above the other, at the terminal ends of a plurality of conveyors. The conveyor sections beyond the gates similarly split their outputs to dual paths, one above the other, for feeding the upper and lower assembly machines. Each assembly machine receives the out-put of four (4) conveyors, one for each of the component parts of the hypodermic syringe to be assembled. These out-puts of the conveyors are from alternate secondary conveyors with diverter gate assemblies and interference assemblies identified as D-1, D-2 and D-3 for varying the flow of parts along their conveyor paths. Upstream from the diverter gates and interference members are the primary portions of the conveyor assemblies. At the in-put end of each conveyor assembly is an injection molding machine identified as P-1, P-2, P-3 and P-4. P-1 illustrates an injection molding machine for relatively flat caps. The mechanisms for such hoppers for feeding the parts from the injection molding machine are commercially available units sold by Aidlin Automation Corp of Sarasota, Fla. Hoppers 90 are of the type as described hereinabove for properly orienting the elongated parts of the various injection molding machines of the three (3) elongated parts to be assembled at the assembly machinery.

Figure 10:
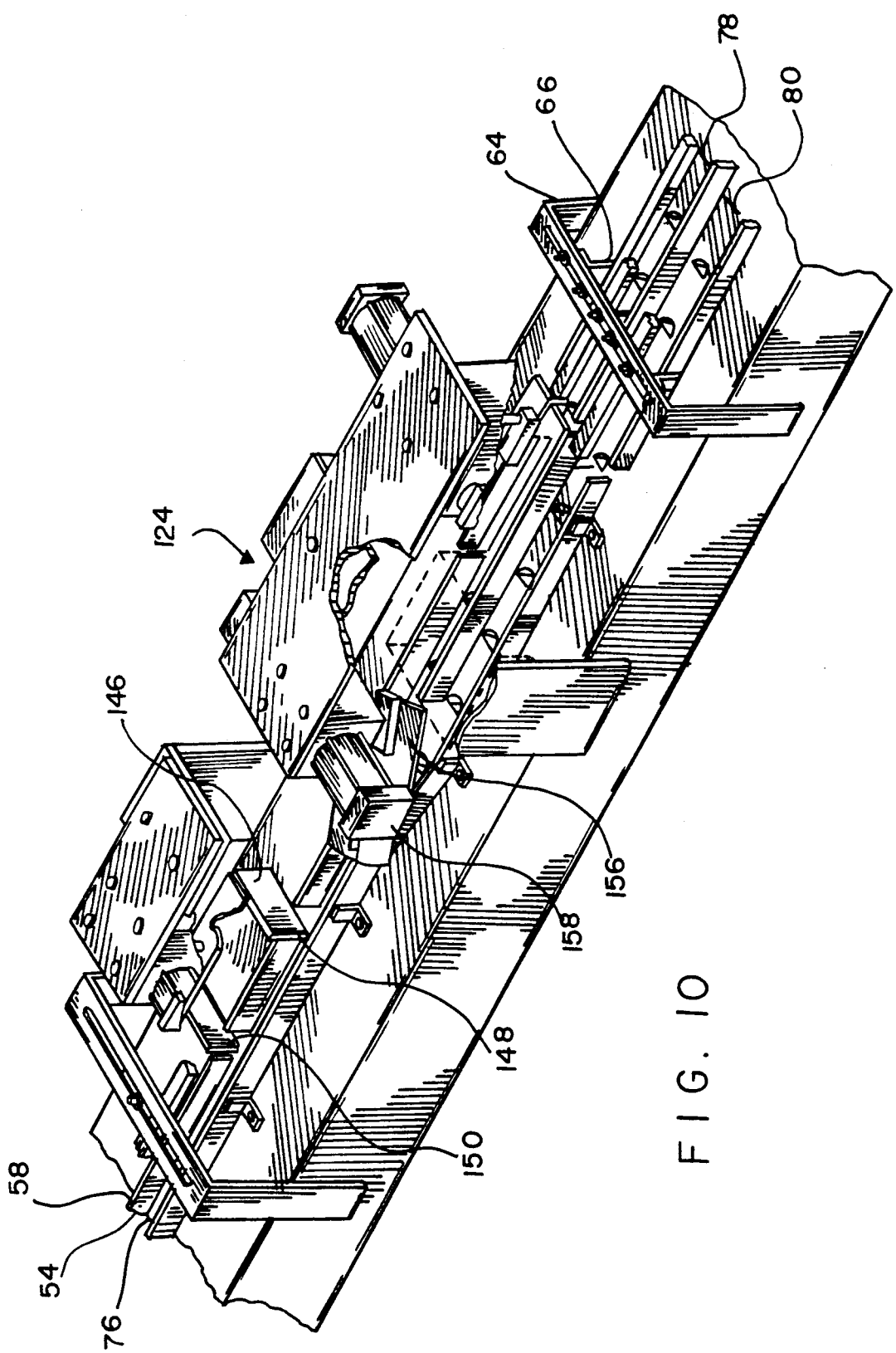
FIG. 10 is a perspective illustration of another conveyor assembly segment of the system of the present invention.

Along the paths of travel, for example, for injection molding machine and hopper P-1 is a diverter assembly D-1 of the type shown in FIGS. 10, 11 and 12 for sequentially feeding segments of this out-put to the first and second assembly machines in alternating fashion. Hopper P-2 for one of the elongated parts, such as the cover 26, diverts its out-put through gate D-2 for sequentially feeding such covers to the first and second assembly machines in alternating fashion. Injection molding machines and hoppers P-3 feed their parts to a common primary conveyor segment through a diverter gate D-3 for alternating its parts to the two (2) assembly machines. Lastly, injection molding machines and hoppers P-4 direct their out-put to a common primary conveyor and then through a diverter gate D-4 for feeding the two (2) assembly machines in sequential fashion. Each of the injection molding machines and associated hoppers P-2, P-3 and P-4 for the elongated parts has an associated alignment wheel 106 as described hereinabove. With the various diverter gates and interference members operable in sequenced fashion through a controller 138, the out-put parts of the various injection molding machines and conveyors can be programmed to feed the various assembly machinery in an optimal time sequence for the most efficient use of injection molding machines and assembly machinery as well as conveyors.

The present invention also includes the method of handling parts 14, 16, 26 and 28 of a hypodermic syringe from pluralities of injection molding machines 70 and 72 to a plurality of assembly machines 84. Such method includes the steps of first supporting a plurality of elongated parts 14, 16 and 26 randomly oriented in a hopper 90 having sidewalls 92 downwardly sloping to a slot 94 of a size to support an enlarged end 38, 40 and 42 of each part but to allow the majority of the length of each part to vertically depend downwardly therefrom. The supported parts are then moved sequentially along the slot 94 to the input end of a primary conveyor 78 for being conveyed with their axes aligned in the direction of the conveying. The next steps are then positioning an indexing wheel 106 at the end of the slot 94, with the indexing wheel being supported rotatable about a horizontal axis parallel with, but off-set from, the slot and formed with radial recesses 108 to sequentially receive the elongated parts depending from the slot followed by the rotating the indexing wheel for thereby moving each received part ninety (90) degrees so that the received part is positioned horizontally for being received by the input end of the primary conveyor 76. The indexing wheel may be operated continuously or intermittently while the conveyor could be at any angle around the periphery of the indexing wheel. Subsequently, the parts are conveyed along the primary conveyor and a plurality of secondary conveyors 78 and 80 for being delivered to the assembly machines 84. While being conveyed along the primary conveyor path, a predetermined number of parts on the primary conveyor 76 are isolated from the remainder of the parts. Such isolated parts are then diverted between the primary and secondary conveyors, the isolated component parts being to one assembly machine or the other in a preprogrammed manner. The method further includes the use of a pair of counter-rotating rollers 98 spanning the slot 94 and urging the parts upwardly for abating the jamming of the parts at the bottom of the hopper 90. In addition, the method further includes the use of a beater bar 114 adjacent to the end of the slot 94 to urge excess parts away from the indexing wheel 106 and thereby abate jamming of the parts as they move from the slot 94 to the recess 108.

FIG. 15 illustrates an alternate embodiment of the invention wherein parts are conveyed from the indexing wheel 106 to the assembly machines 84, not through the apparatus as described above, but rather through tubing 174, 176, 178, etc. which extends from the indexing wheel 106 directly to the assembly machines. The number of lines of tubing equal the number of assembly machines 84. Three such lines of tubing are shown in FIG. 15 to accommodate three separate assembly machines. Such tubing is generally conventional and merely includes mechanisms 182, 184, 186, etc. for establishment of a pneumatic pressure differential between the ends or along the line of the tubing to effect the conveying of parts therein.

In order to accommodate such tubing, the indexing wheel 106 is again moved in step and repeat fashion Instead of drawing the parts from the recesses 108 of the indexing wheel 106 only in a horizontal orientation as shown in FIG. 1 as in the prior embodiment, a fixed cage 190 is positioned over selected portions of the face of the indexing wheel to preclude movement of the parts from the recesses except in selected areas where the cage has openings 192, 194, 196, etc. for withdrawing of such parts from the recesses 108 by the individual lines of tubing. The fixed cage 190 also includes a curved retainer bar 198 adjacent to the periphery of the indexing wheel to preclude sliding of the conveyed parts outwardly from the recesses in regions except adjacent the tubing.

In the FIG. 15 embodiment, the openings in the cage are generally vertical, extending generally upwardly at 11:00, 12:00 and 1:00 positions. As such, when the indexing wheel is positioned with its recesses in rotational orientation adjacent to the input end of the tubing, the indexing wheel is stopped and the pressure differential will be established to withdraw by suction the parts to be conveyed and for effecting movement of the part from the indexing wheel to the assembly machines In this manner, the establishment of paths to direct parts to assembly machines is effected directly at the indexing wheel rather than along the path of travel by diverter mechanisms as in the prior embodiment. Any number of tubing conveyors may be employed at any location about the periphery of the indexing wheel. The shown number and locations are by way of example only. The pneumatic forces moving the parts from the indexing wheel are activated in a programmed manner correlated to the movement of the indexing wheel which may operate continuously or intermittently.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention.

Now that the invention has been described,
What is claimed is:

1. A system for receiving a plurality of component parts of a hypodermic syringe, at least some of which are elongated with one enlarged end, from a plurality of molding machines and for conveying such parts in a preprogrammed manner to a plurality of assembly machines including:

- a plurality of conveyors each having a primary conveyor path for feeding parts from a molding machine and a plurality of secondary conveyor paths for feeding parts from a primary conveyor path to the assembly machines;
- diverter means between the primary conveyor path and secondary conveyor paths for directing to a preselected one of the secondary conveyors and to a preselected assembly machine;
- isolator means on a primary conveyor path to separate a predetermined plurality of parts from all other parts and to allow such separated parts to be fed as a group to the diverter means, the isolator means having a first member positionable across the primary path to stop the movement of fed parts, the isolator means also having a second member positionable across the primary path rearwardly of the first member independent of the movement of the first member across the primary path to stop the movement of parts following the fed parts; and
- orienting means associated with at least some of the primary conveyor paths to move elongated parts in a hopper to a position at the input end of a primary conveyor path with the axes of the parts aligned in the direction of conveying.

2. The system as set forth in claim 1 wherein the orienting means includes a hopper with sidewalls sloping downwardly and with a slot therebeneath, the slot being angled downwardly in the direction of movement of the parts being fed, and an indexing wheel rotatable about a horizontal axis with radial recesses to receive elongated parts vertically depending from the slot and means to rotate the indexing wheel and the received parts so that each received elongated part is moved to an orientation for being received by the primary conveyor path at its input end.

* * * * *